Dec. 23, 1941.   O. KORNEI   2,266,768
MEANS AND METHOD FOR PROTECTING PIEZOELECTRIC UNITS
Filed March 8, 1941
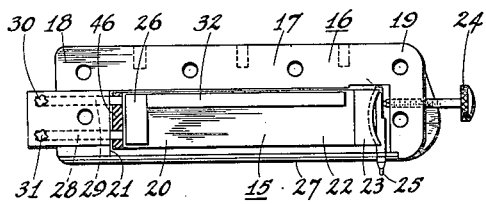
Fig. 1.
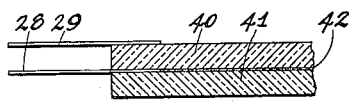
Fig. 2.
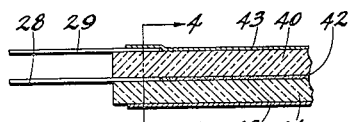
Fig. 3.
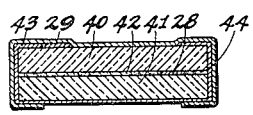
Fig. 4.
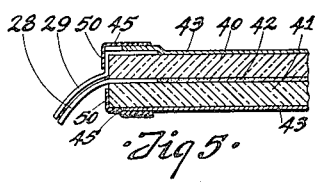
Fig. 5.
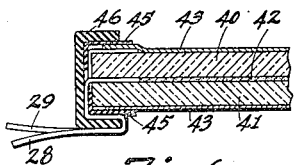
Fig. 6.
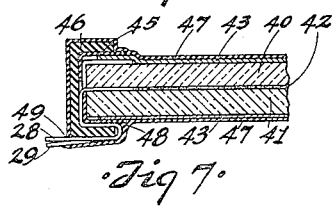
Fig. 7.
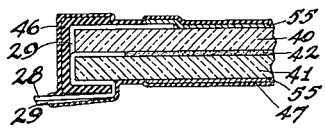
Fig. 8.
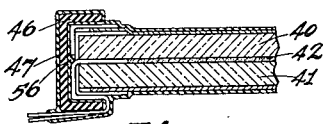
Fig. 9.
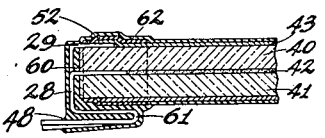
Fig. 10.
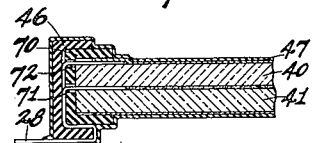
Fig. 11.
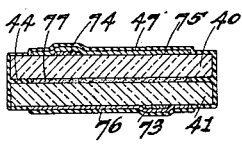
Fig. 12.
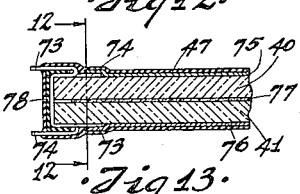
Fig. 13.
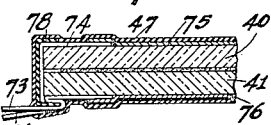
Fig. 14.
Fig. 15.
INVENTOR
Otto Kornei
BY Eber J. Hyde
ATTORNEY Patented Dec. 23, 1941

2,266,768

UNITED STATES PATENT OFFICE 2,266,768

MEANS AND METHOD FOR PROTECTING PIEZOELECTRIC UNITS

Otto Kornei, Cleveland, Ohio, assignor to The Brush Development Company, Cleveland, Ohio, a corporation of Ohio Application March 8, 1941, Serial No. 382,303

11 Claims. (Cl. 171—327)

My invention pertains to protecting a piezoelectric crystal element and more particularly to the means and method for shielding, protecting, and waterproofing a piezoelectric crystal element and strengthening the element leads which are connected thereto.

In piezoelectric devices such as pickups, microphones, loudspeakers, surface analyzers, etc., which depend for their operation upon a piezoelectric transducer unit, it is essential that moisture be kept from the crystal slabs which, together with the electrodes and the leads, comprise the piezoelectric unit. A slight amount of moisture on the crystal slabs is apt to cause a low resistance shunt circuit which effects a reduction of the output voltage generated in the slabs by a bending or twisting strain, or even a short circuit which will reduce the output voltage to zero. When reduction of the output voltage takes place the efficiency of the unit is materially reduced. Moisture on the crystal slabs in a motor device establishes a shunt circuit in parallel with the device thereby reducing the impedance. This usually reduces the motion of the device and may also cause heating of the unit. Crystal slabs which are cut from crystals of Rochelle salt will not operate after they have been subjected to temperatures in the neighborhood of 130° F. or above. Accordingly heat which is generated in the shunt circuit is apt to destroy the piezoelectric properties of the material. It is, therefore, essential that a piezoelectric crystal unit be waterproofed to prevent the ingress of moisture to the crystal slabs.

Effective waterproofing is harder to obtain at the lead end of the unit than it is over the remainder of the crystal slab surface. This is for the reason that waterproofing materials do not stick well to the metallic leads as they do to the crystal slabs and are also apt to shrink as they dry. Further, due to surface tension there is also a tendency for the waterproofing materials to pull away from corners and edges. For these reasons there is often one or more small cracks between the lead and the waterproofing material around it through which moisture may pass to the crystal slabs. Another reason for the difficulty in waterproofing the lead end of a piezoelectric unit is that the leads which engage the crystal slabs are flexible and are adapted to be attached to a transmission path. During manufacture of the unit and also during assembly into a piezoelectric device the leads are bent many times. This frequent bending may cause cracks to develop in the waterproofing material in and about the locations where the leads engage the crystal slabs. It may, therefore, be seen that the location where the most amount of damage can be done by a small amount of moisture is also the location where cracks in the waterproofing material are most apt to occur.

It is, therefore, an object of my invention to reduce the possibility of a crack occurring in the part of the waterproof coating of a piezoelectric unit where electrical leakage is particularly undesirable.

Another object of my invention is to provide protection means for the end of a piezoelectric crystal unit which effectively prevents moisture from entering the end of the unit where the connecting leads are attached.

Another object of my invention is to provide protection means for the end of a piezoelectric crystal unit which strengthens the connection between the unit and the leads.

A further object of my invention is to provide insulation to reduce the heat transfer between a lead for a piezoelectric unit which is being soldered into an electrical transmission path and a piezoelectric crystal unit.

Another object of my invention is to waterproof the end of a piezoelectric crystal unit.

Still another object of my invention is to provide overlapping waterproofing means at the end of a piezoelectric crystal unit.

A further object of my invention is to provide a load distributing cap for a piezoelectric crystal unit.

Another object of my invention is to prevent the bending of the connecting leads from cracking the waterproof coating of a piezoelectric unit and thereby establishing a path through which moisture can effect the crystal.

Other objects and a fuller understanding of my invention may be had by referring to the following description and claims read in conjunction with the drawing in which:

Figure 1 is a side view of a phonograph record cutter with a side plate removed and showing a Rochelle salt type crystal unit embodying my invention.

Figure 2 is an enlarged sectional side view of a portion of two Rochelle salt type crystal slabs showing a step in the process of making a Rochelle salt type crystal unit.

Figure 3 is a sectional side view showing the unit after the foil electrode has been wrapped around the crystal plates and the outer lead.

Figure 4 is a sectional end view taken along line 4—4 of Figure 3 and showing the positioning of the leads.

Figure 5 is a sectional side view showing the unit after an insulating cap has been positioned over the lead end.

Figure 6 is a sectional side view showing a protective cap connected to the unit.

Figure 7 is a sectional side view after the unit has been covered by a waterproofing material.

Figure 8 is a sectional side view of a modified form of my invention in which no insulating cap is required.

Figure 9 is a sectional side view of another modified form of my invention wherein two coats of waterproofing material are used.

Figure 10 is a sectional side view of still another form of my invention.

Figure 11 is a sectional side view of a modified form of my invention in which the leads are passed through the insulating cap.

Figure 12 is a representation of a series connected crystal unit in which the sectional end view is taken along lines 12—12 of Figure 13.

Figure 13 is a sectional side view of a series connected crystal unit in which the leads are brought out on opposite sides thereof.

Figure 14 is a sectional side view of a series connected crystal unit in which the leads are brought out on the same side thereof, and Figure 15 is an isometric view of a preferred form of my protective cap.

Figure 1 of the drawing illustrates my waterproofed piezoelectric crystal unit indicated generally by the reference character 15 and in operative association with a device for cutting records. The record cutting device is identified generally by the reference character 16 and comprises a rigid frame 17 having a long top portion and two shorter downwardly extending end portions 18 and 19. The crystal unit 15 is adapted to be placed under the top portion and between the end portions 18 and 19 with the lead end 20 of the crystal unit 15 against the inside surface 21 of the left end 18 of the frame 17. The end portion 22 of the crystal unit 15 which is opposite the lead end has a stylus holding cap 23 thereon. The end portion 19 of the frame 17 has a set screw 24 threadably positioned therethrough and adapted to hold a cutting stylus 25 in engagement with the stylus holding cap 23 in such a manner that torsional vibration of the crystal unit 15 due to a variable electrical potential being applied thereto will cause the stylus to oscillate. Damping means 26 are positioned on both sides of the crystal unit 15 at the lead end 20, and damping means 32 are positioned on either side of the crystal unit 15 along the top edge thereof. Side plates 27 are screwed or riveted onto the frame 17 and compress the damping means 26 and 32 to cause the damping means to tightly engage the crystal unit 15, thereby holding the crystal unit in place with respect to the frame. For the sake of clarity in Figure 1 the near side plate has been removed. Leads 28 and 29 engage the crystal unit 15 and are adapted to be connected into an electrical circuit by rivets or as shown, by solder at points 30 and 31. A more detailed description of the record cutter may be had by referring to my application Serial No. 317,621. I do not intend, however, to be limited to the use of my invention in connection with record cutters as it is adaptable for use with substantially all piezoelectric elements having leads and which need protection against moisture. The illustration of the record cutter in Figure 1 is merely by way of example, other examples in which my invention may be used being phonograph pickups, microphones, surface analyzers, loudspeakers, etc.

Figure 2 illustrates a step in the process of waterproofing the lead end of a piezoelectric unit in which the leads 28 and 29 are shown in place with respect to two crystal slabs 40 and 41. On one face of the slab 40 and on one face of the slab 41 there is a thin electrode such as a film of graphite. When the two crystal slabs 40 and 41 are cemented together the two graphited surfaces engage each other and establish in effect a single inside electrode 42. The inner lead 28 is positioned between the crystal slabs 40 and 41 and in engagement with the inside electrode 42 to establish an electrical contact therebetween, and the outer lead 29 is positioned against the outside surface of one of the crystal slabs.

As may be seen in Figures 3 and 4, an outside electrode 43 is then wrapped around the two crystal slabs 40 and 41 and in engagement with the outer lead 29 to hold the lead in place and to provide an electrical contact between the outside electrode 43 and the lead 29. A good material for the outside electrode is tin foil as it is a good electrical conductor and can be rubbed into close contact with the piezoelectric crystals and the lead 29. Further the tin foil is substantially moistureproof and provides protection for the crystal 40 and 41. The inside electrode 42 does not cover the entire surface of engagement between the two crystal slabs 40 and 41 as there is a narrow margin 44 around the outside which is unelectroded. This unelectroded margin 44 prevents a short circuit between the inner electrode 42 and the outer electrode 43 which otherwise would effect a short circuiting of the electrical potential in the unit 15 and render the unit inoperative. For a more detailed description of the method of applying the graphite electrode reference may be had to Alfred L. W. Williams' Patent No. 2,106,143 issued on January 18, 1938, and for a more detailed description of the wrapped electrode reference may be had to John H. Ream's application for a patent on Piezoelectric unit and method of making same, Serial No. 344,325. The lead 28, and the lead 29, are offset with respect to each other as may be seen by the end view (Figure 4) in order that they will not touch each other when they are bent across the end of the crystal slabs 40 and 41. This prevents a short circuit between the leads.

After the foil electrode 43 is wrapped around the crystal slabs 40 and 41 an insulating cap 45 (Figure 5) is applied and a protective cap 46 (Figure 6) is positioned over the insulating cap 45. As the protective cap 46 is placed over the end of the crystal slabs 40 and 41 a portion of the leads 28 and 29 is folded into a position against the end surface of the insulating cap 45, and another portion is folded into a position along the side of the insulating cap 45. Due to the offset relationship between the leads 28 and 29, as is shown in Figure 4, and due to the insulating cap 45, the leads do not touch each other and the lead 28 does not touch the electrode 43. Short circuits and shunt circuits are thereby prevented.

To fasten securely the insulating cap 45 and the protective cap 46 to the slabs 40 and 41 a cement may be used and to increase the protection against moisture the cement may be waterproof. After the protective cap 46 has been positioned over the end of the crystal slabs 40 and 41 thereby bending the leads 28 and 29 along a side of the crystal slabs, the leads are bent forward with a length of the leads adjacent a side of the protective cap 46. This step of the process is clearly shown in Figure 6. Next (Figure 7) a coat of waterproofing material 47 is applied over the crystal slabs 40 and 41, electrodes 42 and 43, insulating cap 45, protective cap 46, and the leads 28 and 29. The waterproofing coat 47 causes the leads 28 and 29 to stick along the lower edge of the protective cap 46, and builds up fillets of waterproofing material at points 48 and 49. The fillet 48 is built up at the point where the leads 28 and 29 are bent around the end of the lower edge of the protective cap 46, and the fillet 49 is built up at the point where the leads 28 and 29 extend away from the protective cap 46.

Most waterproofing materials which are suitable for use with Rochelle salt type crystal slabs shrink as they dry, and cause the waterproofing material to pull away from the leads. This tendency to pull away from the leads establishes a path which is apt to allow moisture through to the crystal slabs. With my construction any cracks which develop through the fillets 48 and 49 are relatively harmless as the path along which the moisture must pass to reach a crystal slab is in effect a labyrinth as it is long and well protected by the caps 45 and 46 and by waterproofing material. In my device the point at which the relative movement between the leads and the remainder of the unit takes place is substantially at the fillet 49 where, even if fairly wide cracks do develop, moisture could not seep through and attack the soluble crystal slabs 40 and 41 as long as the leads remained attached along the edge of the protecting cap 46 from the fillet 49 to the fillet 48.

The insulating cap 45 may be made of any material which has an insulating property and may also be waterproof and various shapes may be used. The cap illustrated in the drawing has an end portion 50 (Fig. 5) which is bent around the end of the crystal slabs 40 and 41 to keep the insulator cap from sliding as the protective cap 46 is positioned over it. It may, however, be merely a flat strip of insulating paper wrapped about the crystal slabs 40 and 41 at the lead end of the unit and in overlapping engagement with the electrode 43. This type of insulator is indicated by the reference character 52 in Figure 10.

The protective cap 46 may be made in a wide variety of shapes and of many kinds of materials. One very good material for an application such as is illustrated in Figure 1 is Vinylite. The crystal slabs are in compression due to the set screw 24 pushing the stylus 25 against the stylus holding cap 23, and the Vinylite cap acts as a load distributor; thereby protecting the end of the crystal slabs 40, 41 to prevent the protective waterproof coating from being worn through to the crystal slabs and to prevent breakage of the ends of the crystal slabs as the unit vibrates.

Figure 8 shows a form of my invention in which no insulating cap such as 45 is necessary. The outside electrode 55 is not as long as the electrode 43 and the portions of leads 28 and 29 which are bent back on the crystal slabs 40, 41 by the protecting cap 46 do not extend far enough to touch the electrode 55. The inner lead 28 touches the outside surface of the crystal slab 41 over a short distance but the area of contact is so small that the characteristics of the unit will not be materially affected.

Figure 9 is a cross sectional view of a device somewhat similar to Figure 7. The difference in the two embodiments is that in Figure 9 a coat of waterproofing material 56 has been applied to the unit before the protective cap 46 is cemented over the end. The outside waterproof coat 47 is applied over the protective cap 46 as in Figure 7. This construction provides a double protection against moisture penetrating around the cap.

Figure 10 illustrates another embodiment of my invention in which the assembled and partially completed unit comprised of the crystal slabs 40 and 41, the leads 28 and 29, and the electrodes 42 and 43, is dipped in waterproofing material while the leads 28 and 29 extend substantially straight out from the crystal slabs. The waterproofing material is then allowed to dry to form the waterproof coat 60. The leads 28 and 29 are then folded with a portion of the leads against the end of the crystal slabs and with another portion of the leads extending along a side of the crystal slabs. The leads are then doubled back upon themselves thereby establishing substantially a 180° bend at point 61, and brought forward. The unit is then dipped a second time in waterproofing material which dries to form the waterproof coat 62. If the waterproof coat 60 has an insulating property an insulator such as 52 is not necessary. If, however, the waterproof coat 60 is thin or is not a good insulator a length of insulating material 52 may be wrapped about the crystal slabs to prevent the lead 28 from touching the electrode 43. Because there is no protective cap such as 46 which is slid on over the insulator 52 it is not necessary to have a portion bent over the end of the crystal slabs.

Figure 11 illustrates an embodiment in which an insulating cap 70 having holes 71, 72 therethrough replaces the insulating cap 45. Leads 28 and 29 are brought out through the holes 71, 72 and are folded over by the protective cap 46 and brought out from between the protective cap 46 and the insulating cap 70 at the side of the unit. The protective cap 46 and the waterproof coating 47 are substantially similar to the cap 46 and coating 47 in Figure 7.

Figures 12, 13, and 14 illustrate the application of the invention to series connected crystal units. Figure 12 is a cross section of Figure 13 showing the method of applying the electrodes 75 and 76 to the crystal slabs and to the leads 73 and 74, and showing the leads offset with respect to each other to prevent short circuiting when they are folded across the ends of the crystal slabs 40 and 41. In Figure 13 the lead 73 is in engagement with crystal slab 41 and in engagement with electrode 76, and the lead 74 is in engagement with the crystal slab 40 and in engagement with the electrode 75. The crystal slabs 40 and 41 are cemented together, but no center lead is brought out from between them. The leads 73, 74, are then crossed over the ends of the crystal slabs 40, 41, and a cap 78 is applied to the end. A waterproof coating 47 may then be applied to the entire unit.

In Figure 14 the leads 73 and 74 are brought out on the same side of the unit. The lead 74 is in engagement with the electrode 75 and passes across the ends of the crystal slabs 40 and 41. The lead 73 is in engagement with the electrode 76 and is doubled back upon itself. The cap 78 engages the doubled back portion of the lead 73 and the waterproof coat 47 holds both leads 73, 74 against the cap 78 to prevent movement of the leads from cracking the waterproof coat at a point which would permit moisture to reach the crystal slabs.

Figure 15 is an isometric view of a preferred form of the protective cap 46. When made of Vinylite or other substantially similar material and in the shape illustrated, it functions as a protective means in several different ways. It establishes an improved waterproof connection between the crystal slabs and the leads which are connected thereto, and it also establishes a heat shield between the solder points 30, 31, and the crystal units. Rochelle salt is not stable at temperatures of 130° Fahrenheit or above and if the unit is subjected to temperatures of that magnitude the piezoelectric effect is permanently destroyed and will not come back upon cooling the unit. It is, therefore, essential that no part of the crystal slabs be subjected, even for a very short period of time, to a high temperature.

A protective cap such as 46 establishes a heat shield between the crystal slabs and the hot iron which may be used to make the soldered joint.

In the design of a piezoelectric unit care must be exercised to prevent resonance peaks in the frequency response. To obviate these undesirable resonance peaks the damping pads must be carefully designed and must be carefully placed against certain areas of the piezoelectric crystal unit, and the pressure which they exert against the unit must be carefully adjusted. For these reasons in the preferred form of my invention I have shown the damping means and the protective cap means as separate units. The dynamic properties of the protective cap, such as mass, stiffness, and internal damping, will therefore be virtually independent of and will have no noticeable effect upon the vibratory system consisting of crystal element and damping means. It is, therefore a relatively simple engineering problem to design the damping pads and the protective cap means independently of each other. It is to be understood, however, that I recognize the possibility of combining the several functions and that my claims are drawn with this in mind. I have described my invention in detail with respect to a cap such as the protective cap 46 connected to one end of the unit. It is to be understood, however, that my improved connection between the leads and the crystal slabs may be effected in many other ways, and that caps may be applied to both ends of the unit if it is found desirable to bring one lead out of each end of the unit. Further, it is to be understood that my invention may be applied to single crystal slabs as well as to crystal elements having two or more slabs.

Although I have described my invention with a certain degree of particularity, it is to be understood that the present disclosure has been made only by way of example and that number changes in the details of construction and the combination and arrangement of parts may be resorted to without departing from the spirit and the scope of the invention as hereinafter claimed.

I claim:

1. A waterproof engagement between a piezoelectric unit and a flexible lead which has a free end adapted to be attached to a transmission path, comprising a moisture-proof coating around said crystal slab means and said lead, said coating establishing a fillet between the said crystal slab means and the said lead, said coating also attaching said lead to said crystal slab means between the said fillet and the free end of the said lead to prevent cracking of the said fillet upon the flexing of the free end of the said lead.

2. A moisture-proof covering for an end and a portion of the sides of a piezoelectric crystal element having lead means extending from said end thereof, and adapted for use in a supporting frame which compresses said unit, comprising, in combination, substantially moisture-proof insulating cap means having a bottom portion and side portion means, said bottom portion of the cap engaging the lead end of the said crystal element and folding the said lead means toward the side of said crystal element and said side portion means engaging the said lead means and the said sides of the said crystal element, the lead means being brought out from the said crystal element between the element and the said side portion means of the said cap, and a waterproof coating around said cap means and the end of the said crystal element, and said insulating cap means also acting as a load distributor between said crystal element and said frame within which the said crystal unit is held.

3. A moisture-proof wrapping for a piezoelectric crystal element having lead means extending from one end thereof comprising electrode means having a moisture-proofing property wrapped around said crystal element, insulating means having a moisture-proofing property wrapped around a portion of said electrode means, an insulating cap having a moisture-proofing property and having a bottom portion and side portion means, said bottom portion of the cap engaging the lead end of the said crystal element and said side portion means overlapping and engaging the said insulating means, said lead means being brought out from the said crystal element between the said insulating means and the said cap, and a waterproof coating around said electrode means, said insulating means, said cap means and said lead means.

4. A moisture-proof wrapping for a piezoelectric crystal unit having flexible lead means extending from an end thereof comprising, substantially U-shaped cap means having a bottom portion and two side portions, said bottom portion engaging an end of said crystal unit and said two side portions engaging two sides of said crystal unit, said flexible lead means being bent back upon the said crystal unit by the said cap means and extending outwardly between a side of the said crystal unit and a side of the said cap means; and waterproof coating means around said crystal unit, said cap means, and said lead means; said cap member preventing the cracking of the said waterproof coating upon the flexing of the said lead means.

5. A substantially waterproof piezoelectric unit comprising, in combination, a first crystal slab, a second crystal slab, first electrode means between said first and said second crystal slabs and in intimate contact with each, second electrode means wrapped around said first and said second crystal slabs and forming a waterproof coating, lead means in engagement with said electrode means and extending from one end of the said unit, insulation means around said second electrode means at the lead end of the said unit, a cap member over the said lead end of the unit, said cap member bending the said lead means into engagement with the said insulation means, and waterproof coating means covering said unit, said cap member preventing the cracking of the said waterproof coating means substantially at the point where the said lead means engages the said insulation means.

6. A moisture-proof cap for a piezoelectric crystal element having an externally wrapped electrode means, inner lead means, and outer lead means connected to said electrode means at one end of said element, comprising, insulating means covering part of the said externally wrapped electrode means, substantially U-shaped cap means having bottom means and terminating extended side means, said cap means being over the lead end of the said crystal element with the said bottom means thereof in engagement with the said lead means to constrain a portion of said lead means against the end of the said element, and with said extended side means thereof in engagement with the said lead means to constrain a portion of said lead means against said insulating means and to constrain said insulating means against said external electrode, said lead means being bent back upon themselves around the said termination of the side means of the said cap, and waterproof coating means around the said lead means and connecting a portion of said lead means to the side means of the said cap.

7. The method of waterproofing a piezoelectric crystal unit having two flexible leads which comprises the steps of wrapping a moisture-proof electrode around said crystal unit and in engagement with one of said leads, applying an insulator to a portion of said electrode, applying an end cap to the lead end of the said unit to fold the said two leads into engagement with the said insulator, and applying a waterproof coating to said crystal unit, said electrode, said insulator, and said cap to enclose said crystal unit in a waterproof shield which will not crack open upon the said leads being flexed.

8. The method of protecting the end of a piezoelectric crystal unit which has lead means extending therefrom, comprising the steps of: providing substantially U-shaped protective channel means, placing said channel means around the end of the said crystal unit with the said lead means extending outwardly between the said crystal unit and the said channel means, and coating the said channel means and the said crystal unit with a waterproofing material.

9. A moisture-proof seal for a piezoelectric unit having electrode means including an external electrode wrapped around a moisture sensitive crystal slab and having lead means connected to said electrode means, said lead means extending from an end of the said unit, said seal comprising, in combination, a first moisture repellent cap having hole means therethrough adapted to receive said lead means, said first cap being on the lead end of the said unit in overlapping engagement with the said external electrode and with the said lead means of the unit extending through the said hole means of the cap, and a second moisture repellent cap over the said first cap with the said lead means extending between the said first and second caps.

10. A waterproof connection between a moisture sensitive element and lead means for said element which extend from an end thereof comprising, in combination, first waterproof cap means having bottom portion means and side portion means and having hole means therethrough adapted to receive said lead means, said first cap means being on the lead end of said element with the said lead means extending through the said hole means and with the bottom portion means thereof engaging the end of the said element and with the side portion means engaging sides of the said element, second waterproof cap means having bottom portion means and side portion means, said second cap means being on the lead end of said element with the bottom portion means thereof constraining the lead means against the bottom portion means of the said first first cap means, and with the side portion means of the said second cap means in engagement with the said side portion means of the said first cap means, and with the said lead means extending between the said first and second cap means; and waterproofing means connecting said lead means to the said side portion means of the said second cap means.

11. The process of waterproofing a piezoelectric unit having a flexible lead connected thereto comprising the steps of, covering the said unit and a portion of the said lead with a waterproof material, drying the said waterproofing material, folding a portion of the said lead against the said unit, covering the said unit and the portion of the said lead which is folded against the said unit with waterproofing material, and drying the said waterproofing material.

OTTO KORNEI.